United States Patent [19]
Gosling

[11] Patent Number: 5,927,157
[45] Date of Patent: Jul. 27, 1999

[54] AXIAL TENSIONED BOLTING SYSTEM AND METHOD THEREOF

[75] Inventor: Martin Charles Gosling, Hamilton, Canada

[73] Assignee: Siemens Westinghouse Power Corporation, Orlando, Fla.

[21] Appl. No.: 08/763,388

[22] Filed: Dec. 16, 1996

[51] Int. Cl.$^6$ .................................................. B25B 17/00
[52] U.S. Cl. ........................................... 81/57.38; 29/452
[58] Field of Search ................ 81/57.38, 54; 254/29 A; 29/452

[56] References Cited

U.S. PATENT DOCUMENTS

| | | | |
|---|---|---|---|
| 3,316,795 | 5/1967 | Tann | 411/17 |
| 3,566,947 | 3/1971 | Jukes | 411/17 X |
| 4,246,810 | 1/1981 | Keske | 81/57.38 |
| 4,438,901 | 3/1984 | Reneau et al. | 29/452 |
| 4,708,036 | 11/1987 | Vossbrinck | 81/57.38 |
| 4,773,146 | 9/1988 | Bunyan | 81/57.38 |
| 5,662,012 | 9/1997 | Grabovac | 81/467 |

FOREIGN PATENT DOCUMENTS

| | | |
|---|---|---|
| 0080743 | 6/1983 | European Pat. Off. . |
| 0609924A1 | 8/1994 | European Pat. Off. . |
| 0609925 | 8/1994 | European Pat. Off. . |
| 1150062 | 4/1969 | United Kingdom . |
| 2032822 | 5/1980 | United Kingdom . |
| 2223075 | 3/1990 | United Kingdom . |
| 2236372 | 4/1991 | United Kingdom . |
| 2247928 | 3/1992 | United Kingdom . |
| 2267944 | 12/1993 | United Kingdom . |
| 2274892 | 8/1994 | United Kingdom . |
| WO95/33598 | 12/1995 | WIPO . |

OTHER PUBLICATIONS

Gosling, M.C., "Improved Turbine Cylinder Bolting System", 1996, International Gas Turbine and Aeroengine Congress and Exhibition at Birmingham, U.K. (ASME paper 96–GT–524.).

HeliCoil Sales Literature Concerning Screw Thread Inserts.

Goodier, J.N., "The Distribution of Load on the Threads of Screws", *Journal of Applied Mechanics* Mar., 1940, pp. A–10–A–16.

Gosling, M.C., "Improved Turbine Cylinder Bolting System" (unpublished).

Stoeckly, E.E. and Macke, "Effect of Taper on Screw–Thread Load Distribution", *Transactions of the ASME* Jan., 1952, pp. 103–110.

*Primary Examiner*—David A. Scherbel
*Assistant Examiner*—Joni B. Danganan

[57] ABSTRACT

A bolting system for securing at least two structures having a bolt, a coupling nut, a hydraulic tensioner, and a lock nut. The bolt has a body with a threaded end and another end with a bolt head. The coupling nut is engageable with the threaded end of the bolt and has a top face having one or more dog indentations. The hydraulic tensioner has a hydraulic cell with an engagement end that engages the threaded end of the bolt. The hydraulic cell stretches the bolt while an engaging member of the hydraulic tensioner engages the dog indentations of the coupling nut with complementing, engaging member dogs. The engaging member rotates the coupling nut while the engagement end of the hydraulic tensioner tensions the bolt. The lock nut is engageable with the threaded end of the bolt.

14 Claims, 8 Drawing Sheets

AXIAL TENSIONED BOLTING SYSTEM AND METHOD THEREOF

FIELD OF THE INVENTION

The present invention relates to an axial tensioned bolting system and method thereof. More specifically, the present invention relates to bolting a marriage coupling of a rotor.

DESCRIPTION OF THE PRIOR ART

The prior art discloses that bolts in turbines and other applications are pretensioned by axially rotating the nut to a certain torque. Proper bolt tensioning is ensured by stretching the bolt to a specific elongation. However, rotating the nut to a certain torque is not an accurately repeatable method to stretch a bolt. To ensure a proper elongation of a bolt using the torque method, the bolt is repeatedly stretched and measured until the desired elongation is achieved. However, repeating the stretching and measuring procedure is inefficient.

The prior art discloses axial tensioning of machined bolts that have a hexagonal hole machined in the bolt head. The hexagonal hole adds cost to the bolts, decreases the mechanical integrity of the bolt head, and does not allow for the use of an ultrasonic bolt length determining device to check the elongation of the bolt. To measure the bolt length with an external micrometer, a plug needs to be placed in the hexagonal hole. The use of the plug counterproductively adds error to the length measurement. The hexagonal hole also needs to be sealed to prevent air flow problems when the bolt is used in marriage couples for rotors.

The prior art discloses peening the lock nut to the surface of the structures being bolted. This peening damages the lock nut and increases the difficulty in removing the lock nut.

The prior art discloses using a hydraulic tensioner on a stool to axially tension bolts. The stool has a key window that permits access to key holes in the outside surface of the nut on the axially tensioned bolt. To rotate the nut, a key is inserted through the key window and into a first key hole and the nut rotated the limit of the key window. The key is then advanced to a second key hole now exposed in the key window and the process is repeated. In addition to this process being slow, the key window detrimentally affects the mechanical integrity of the stool and the key holes add an extra cost to the nut.

The prior art discloses tensioning one bolt at a time when bolting a marriage coupling together. This is to ensure that the loading on the marriage coupling is balanced. However, tensioning one bolt at a time with a marriage coupling that may have 42 bolts, or more, is a long process with high labor costs.

It is therefore desirable to provide a bolting system for securing structures with an axially pretensioned bolt. Additionally, it is desirable to provide a single step method that accurately, precisely, and quickly pretensions a bolt without the need to measure bolt elongation.

SUMMARY OF THE INVENTION

According to the invention, there is provided bolting system for securing at least two structures having a bolt, a coupling nut, a hydraulic tensioner, and a lock nut. The bolt has a body with a threaded end and another end with a bolt head. The coupling nut is engageable with the threaded end of the bolt and has a top face having one or more dog indentations. The hydraulic tensioner has a hydraulic cell with an engagement end that engages the threaded end of the bolt. The hydraulic cell stretches the bolt while an engaging member of the hydraulic tensioner engages the dog indentations of the coupling nut with complementing, engaging member dogs. The engaging member rotates the coupling nut while the engagement end of the hydraulic tensioner tensions the bolt. The lock nut is engageable with the threaded end of the bolt.

DETAILED DESCRIPTION OF THE PREFERRED EMBODIMENT(S)

Figure 1:
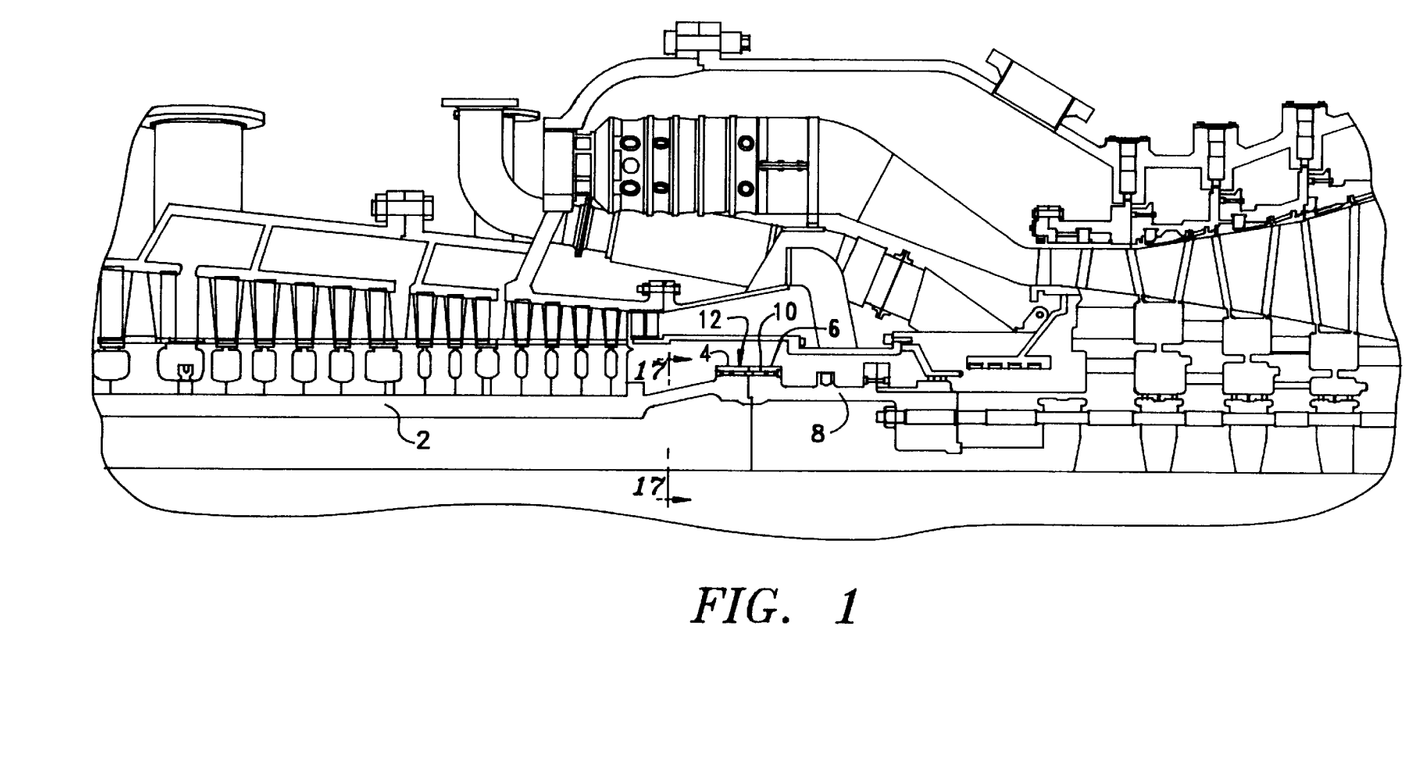
FIG. 1 is a longitudinal cross-section of a compressor and expander rotor.

Now referring to the figures, wherein like reference numbers refer to like elements, FIG. 1 shows a compressor rotor 2 with a flange 4 joined to a flange 6 of an expander rotor 8. The flanges 4 and 6 are bolted together with axially tensioned bolts 10 to form a marriage coupling 12. Except for the design of the bolt 10, the compressor and expander rotors illustrated in FIG. 1 are prior art. Other embodiments of the invention bolt together other structures.

Now referring to FIGS. 2–5, the bolt 10 has a body 12 with a threaded end 20 and a bolt head 14 therein. The bolt head 14 has a top surface 16 with extension indentations 18. In the preferred embodiment of the invention, the extension indentations 18 are notches at the perimeter of the top surface 16. By having notches at the perimeter, the bolt head does not have to be machined, the bolt head integrity is maintained, and the top surface 16 has a large, flat center portion that enables the use of a ultrasonic bolt length determining device or an external micrometer to measure the length of the bolt directly. Other embodiments of the invention may have other arrangements and shapes of the indentations 18. In the preferred embodiment, the notches 18 are such that the top surface 16 of the bolt head 14 need not be sealed to have an aerodynamic surface. In the preferred embodiment of the invention, the bolt 10 is forged from Inconel 718, the threaded end 20 has rolled threads, and the bolt head 14 is stamped. Other embodiments of the invention may use bolts that are machined or other metals.

Figure 2:
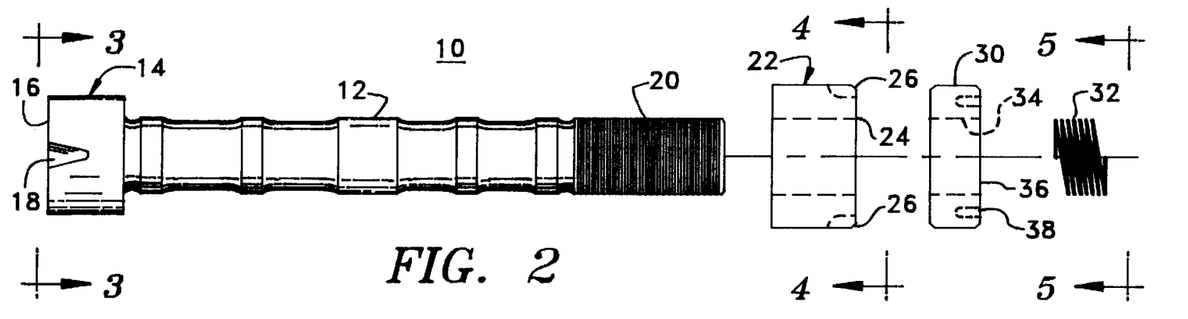
FIG. 2 is an exploded view of a bolt, coupling nut, and lock nut that may be used in connection with the practice of the invention.
Figure 3:
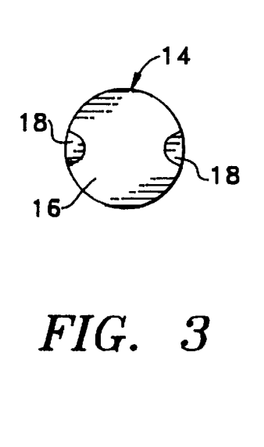
FIG. 3 is a cross-section of the bolt head taken through line 3—3 in FIG. 2.
Figure 4:
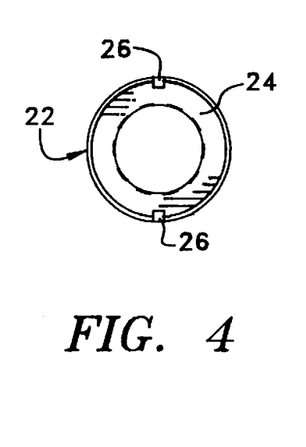
FIG. 4 is a cross-section of the coupling nut taken through line 4—4 in FIG. 2.

A coupling nut 22 is used in bolting the flanges 4 and 6 together. The coupling nut 22 is engageable with the threaded end 20 and has a top face 24 that is oriented away from the bolt head 14. The top face 24 has two dog indentations 26 in the top face that are 180° apart. Other embodiments of the invention may have other arrangements and shapes of the dog indentations 26.

Figure 5:
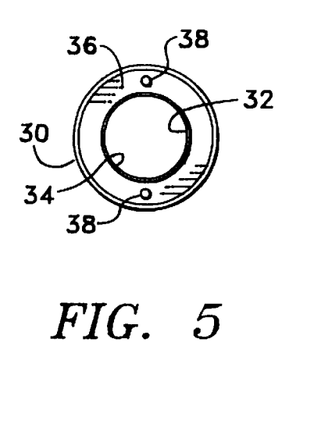
FIG. 5 is a cross-section of the lock nut taken through line 5—5 in FIG. 2.

In the preferred embodiment of the invention, a lock nut 30 locks the coupling nut 22 in place. The lock nut 30 has a coil insert 32 engaging the internal threads 34 of the lock nut. The coil insert 32 is a commercially available item offered by HeliCoil, 4850 Barranca Pkwy., Irvin, Calif. 92714 as Heli-Coil Insert Screw-Lock. Other coil inserts that provide a self-locking torque on the threaded end 20 are also suitable for practicing the invention. Using the coil insert 32 obviates the need to peen the lock nut, which also makes removing the lock nut quicker. The lock nut 30 has a top face 36 that is oriented away from the coupling nut 22 and has extension indentations 38, or pin holes. Other embodiments of the invention may have other arrangements and shapes of the extension indentations 38. Other embodiments of the invention may have other locking means for locking the coupling nut 22 onto the threaded end 20.

Figures 6, 7:
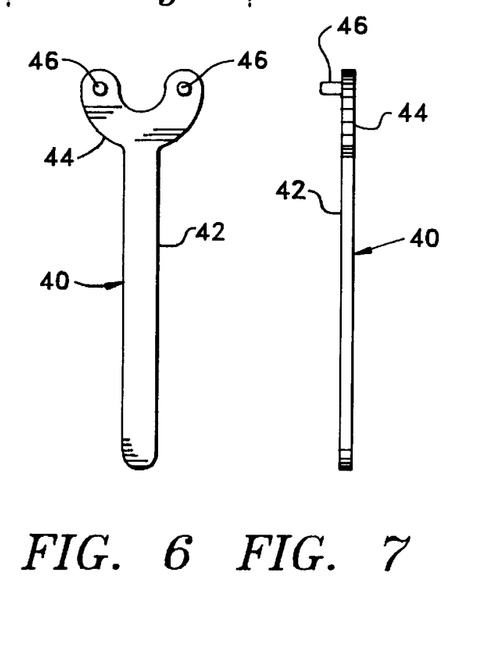
FIGS. 6 and 7 are front and side views, respectively, of a lock nut tool employed in the practice of the present invention.

The extension indentations 38 of the lock nut 30 complement the extending members 46 of a lock nut tool 40 shown in FIGS. 6 and 7. The lock nut tool 40 has a handle 42 with a forked portion 44 at one end. Extending members 46, or pins, extend from the forked portion 44 such that the extending members 46 can engage the extension indentations 38 of the lock nut 30 and the tool can rotate the lock nut on the threaded end 20. Other embodiments of the invention may have other arrangements for the extension indentations 38 and the tool 40. Other embodiments of the invention may have a bolt head tool 48 (See FIG. 8) that is similar to the lock nut tool. The bolt head tool 48 has extending members 50 that complement the extension indentations 18 of the bolt head 14 and the tool is used to control the bolt head during bolting.

Figure 8:
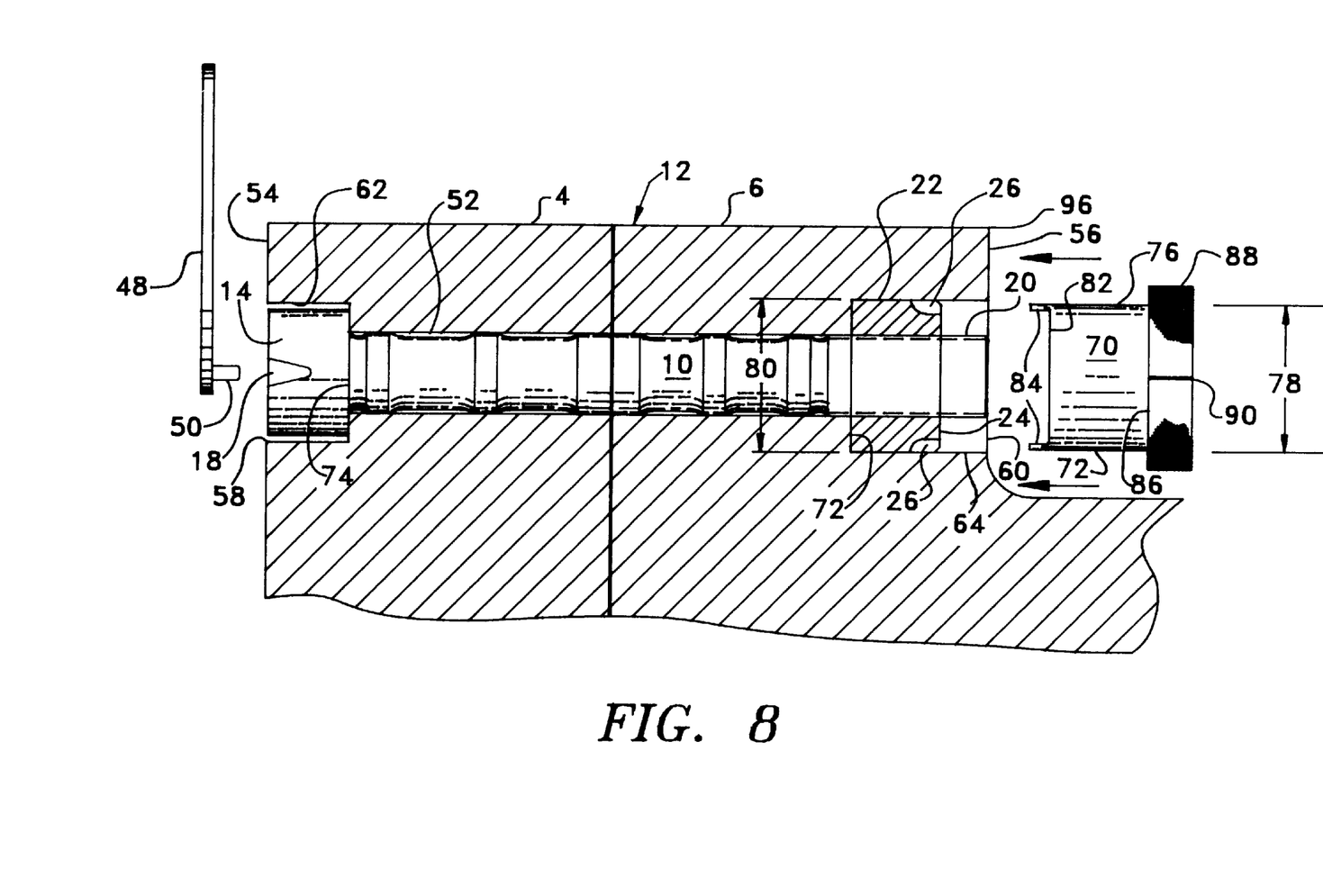
FIG. 8 is a side view of the bolt and coupling nut in shown preparation to secure to flanges.

Referring to FIG. 8, the bolt 10 is shown in a bolt hole 52 that extends from a flange exterior surface 54 of flange 4 to a flange exterior surface 56 of flange 6. The bolt hole 52 has two surface openings 58 and 60 at the flange exterior surfaces 54 and 56, respectively. In the preferred embodiment, recesses 62 and 64 are at the surface openings 58 and 60, respectively. Recess 62 accommodates the bolt head 14 while recess 64 accommodates coupling nut 22 and lock nut 30. As a result, the flange exterior surface surfaces 54 and 56 are flat, which cuts down on air resistance and accompanying problems while the rotors 2 and 8 are in operation. Other embodiments of the invention may not have recesses.

The coupling nut 22 is engaged with the threaded end 20 of the bolt 10. The coupling nut may be rotated by hand while initially engaging the coupling nut 22 to the threaded end 20. After the coupling nut 22 is in the recess 64, an engagement tool 70 is used to rotate the coupling nut 22 until a bottom face 72 of the nut is in close proximity to, if not contact with, the flange 6 and a bottom surface 74 of the bolt head 14 is in close proximity to, if not contact with, the flange 4. The bolt head tool 48 assists in engaging the coupling nut 22 to the bolt 10 by holding the bolt still while the nut is rotating, by rotating the bolt 10 while the coupling nut is held stationary, or a combination thereof.

In the preferred embodiment, the engagement tool 70 is a cylinder 72 having an outside diameter 78 that is approximately equal to the outside diameter 80 of the coupling nut 22. The cylinder 72 has a bottom edge 82 and a top edge 86. Two engagement tool dogs 84 extend from the bottom edge 82 and complement the dog indentations 26 of the coupling nut 22. A rim 88 extends from the top edge 86. In the preferred embodiment, the two engagement tool dogs 84 are 180° apart and there are two marks 90 on the rim 88 that are 180° apart and 90° offset from the engagement tool dogs 84. To use the engagement tool 70 to continue rotating the coupling nut 22, the engagement tool dogs 84 are engaged with the dog indentations 26, thereby placing the engagement tool 70 and the coupling nut 22 in cooperative communication, and the tool is rotated by grasping and rotating the rim 88. Other embodiments of the invention may use elements other than a cylinder to be the component of the engagement tool 70 that is rotated.

Figure 9:
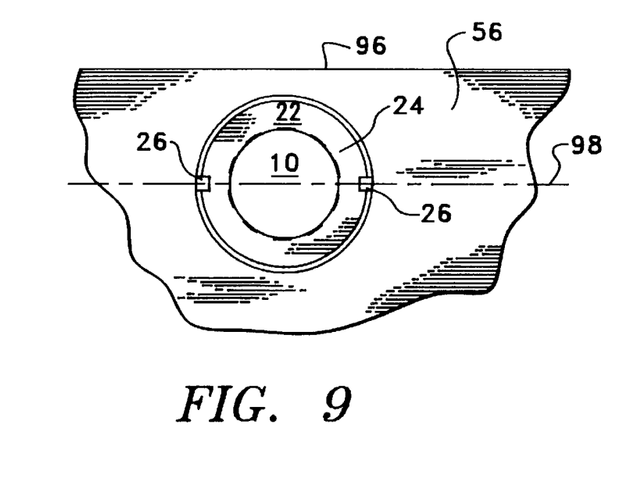
FIG. 9 is a detail showing the dog indentations of the coupling nut in a predetermined position.

The marks 90 of the engagement tool 70 indicate the position of the dogs 84 and, therefore, the position of the dog indentations 26. This is beneficial in that the engagement tool is used to place the dog indentations in a predetermined position, which is shown in FIG. 9. When in the predetermined position, the dog indentations define a line 98 that is generally parallel to the edge 96 of flange exterior surface 56 and the marks 90 define a line (not shown) that is perpendicular to the edge 96. Other embodiments of the invention may have other predetermined positions and other means to determine if the dog indentations 26 are in the predetermined position.

Figure 10:
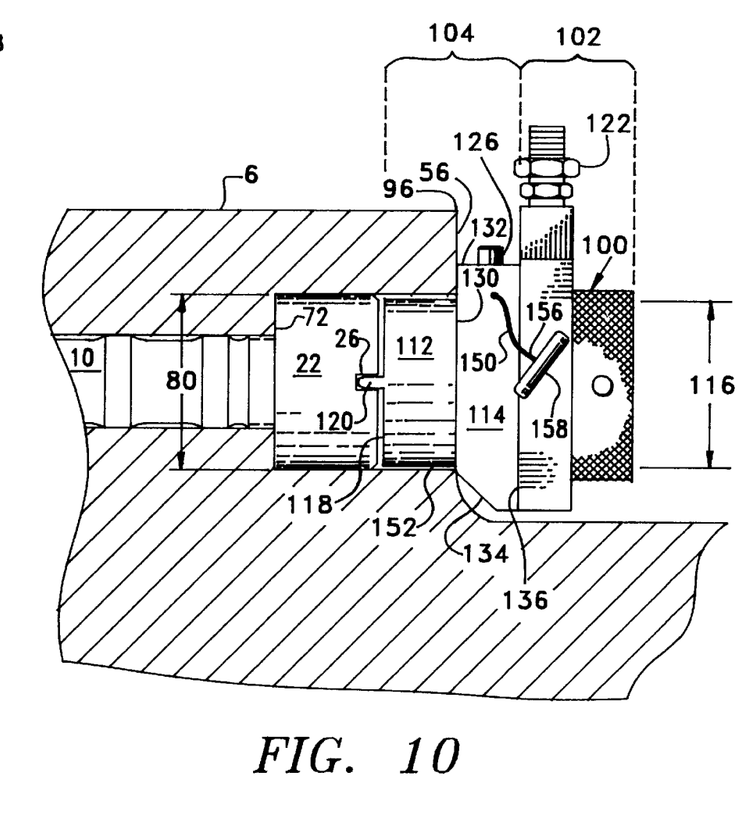
FIG. 10 is a detailed side view of the hydraulic tensioner engaged with the bolt and coupling nut.
Figure 11:
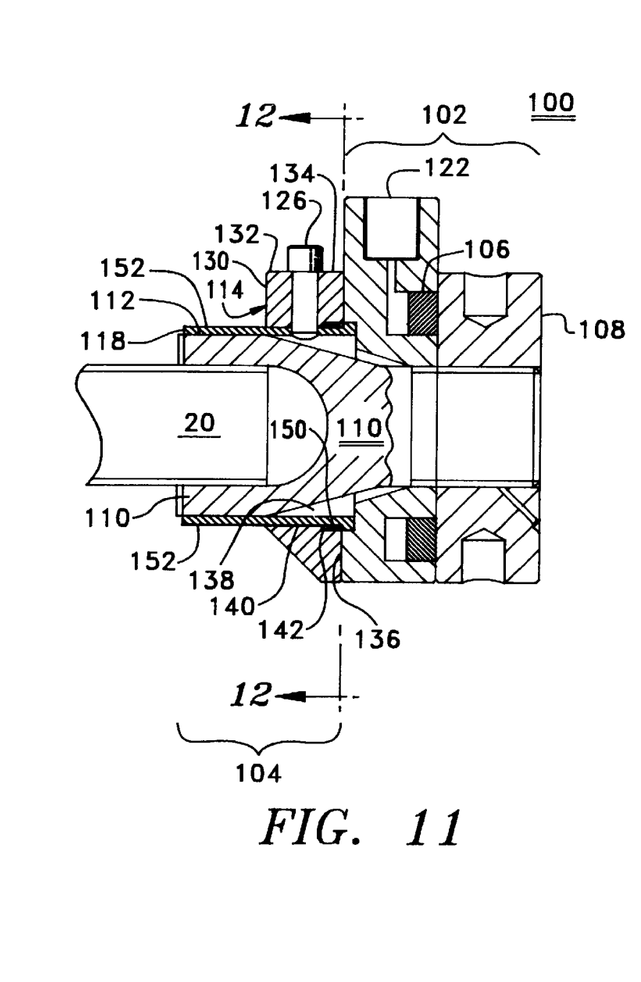
FIG. 11 is a detailed cross-section view of the hydraulic tensioner.

Referring now to FIGS. 10 and 11, a hydraulic tensioner 100 is engaged with the threaded end 20 of the bolt 10. The hydraulic tensioner 100 has a tensioning means 102 and a rotating means 104. The tensioning means 102 is a typical hydraulic cell having a piston 106 and a puller 108, or cylinder. The puller 108 has an engagement end 110 that engages the threaded end 20 of the bolt 10. The tensioning means pulls, or axially tensions, the bolt 10 when hydraulic fluid is pumped into the cell through hydraulic fluid opening 122. The pulling is done without rotating the coupling nut 22. By axially tensioning the bolt in this manner, the bolt is stretched to a specific hydraulic load which has been calibrated to correspond to a specific lengthening of the bolt. This speeds the assembly process by requiring that a bolt need only be stretched once. Further, it eliminates the need to measure the elongation of the bolt. However, with the design of the top surface 16 of the bolt head 14, an external micrometer or an ultrasonic bolt length determining device may be used to measure the bolt if desired.

Figure 12:
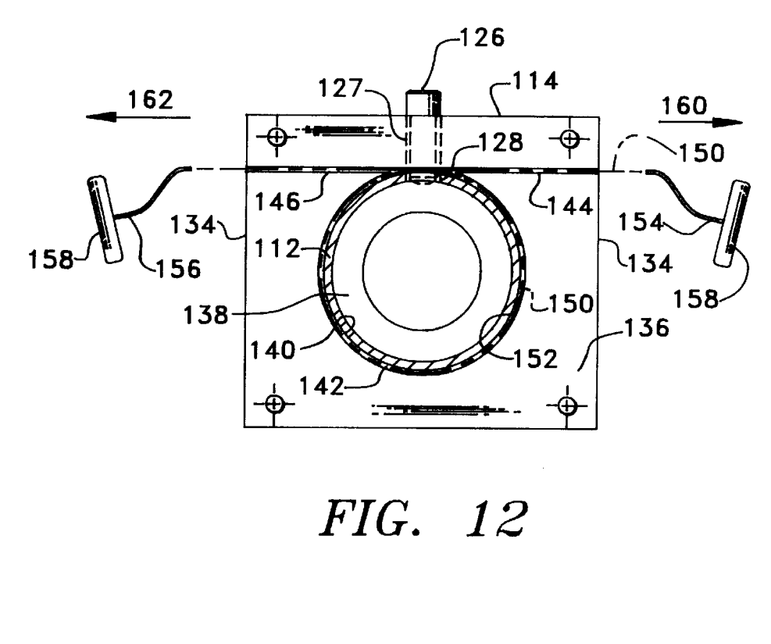
FIG. 12 is a cross section of the tensioning means support taken through line 12—12 in FIG. 11.

In the embodiments shown in FIGS. 10, 11 and 12, the rotating means 104 has a rotatable engaging member 112 and a tensioning means support 114. The tensioning means support 114 has a bottom surface 130 with a perimeter edge 132. An exterior surface 134 extends from the perimeter edge 132 and terminates at a top surface 136. A support opening 138 extends through the bottom surface 130 and the top surface 136, the support opening being defined by an interior surface 140. The engaging member 112 extends through the support opening 138. The tensioning means 102 is disposed on the top surface 136 and the bottom surface is disposed on the flange exterior surface 56.

The engaging member 112 is a tube having an outside diameter 116 approximately equal to the outside diameter of the coupling nut 22. The engaging member 112 has a bottom edge 118 from which extends engaging member dogs 120. The engaging member dogs 120 complement the dog indentations 26. The engaging member 112 defines a center space in which is disposed a portion of the engagement end 110 of the tensioner means 102. In other embodiments of the invention, other suitably configured engaging members may be used.

When the hydraulic tensioner is being engaged with the threaded end 20 of the bolt 10, the engaging member 112 is locked into a position that enables the engaging member dogs 120 to be engaged with the dog indentations 26 of the coupling nut 22 that are in the predetermined position. The engaging member 112 is locked into position with a tube positioning means that comprises a pin 126 removably extending through a hole 127 in the tensioning means support that extends through the exterior surface 134 and interior surface 140 and a hole 128 that extends through the engaging member 112. The pin 126 is inserted by rotating the engaging member 112 in the tensioning means support 114 until the holes 127 and 128 align and by passing the pin therethrough. In some embodiments of the invention, the pin 126 may be removable from the tensioning means support 114, while other embodiments may have the pin 126 spring-loaded in the tensioning means support 114 (not shown).

When the hydraulic tensioner 100 is not engaged with the bolt 10, the rotating means 104 may be turned by grasping and turning it. However, once the hydraulic tensioner is engaged with the threaded end 20 of the bolt 10, a cord 150 is used to rotate the rotating means 104. In the embodiment shown, the cord 150 extends around the outside surface 152 of the engaging member 112 for 4 turns, however, other embodiments of the invention may have more or less turns, including a partial turn. The cord 150 is located in a latitudinal groove 142 that extends radially into the interior surface 140. A first cord hole 144 and a second cord hole 146 extend from the latitudinal groove 142 and through the exterior surface 134. In the preferred embodiment of the invention, the holes 144 and 146 extend tangentially from the groove. The cord 150 has a first cord end 154 and a second cord end 156 extending through the holes 144 and 146, respectively.

The engaging member 112 is rotated by first positioning the cord 150 on the outside surface 152 of the rotating means 104 by pulling on the first cord end 154 and the second cord end 156 with a first force 160 and a second force 162, respectively. Handles 158 assist in pulling the cord ends. By the forces 160 and 162 pulling the cord ends, not only is the cord 150 positioned on the surface 152, but a frictional force is created that is great enough to place a torque on the engaging member 112 when the first force 160 is greater than the second force 162. When enough torque is applied, the engaging member 112 rotates, thus rotating the coupling nut 22 until its bottom surface 72 contacts flange 6. In the preferred embodiment, the cord 150 is a relatively stiff wire that expands into the groove 142 when no force is applied to the cord ends.

Figure 13:
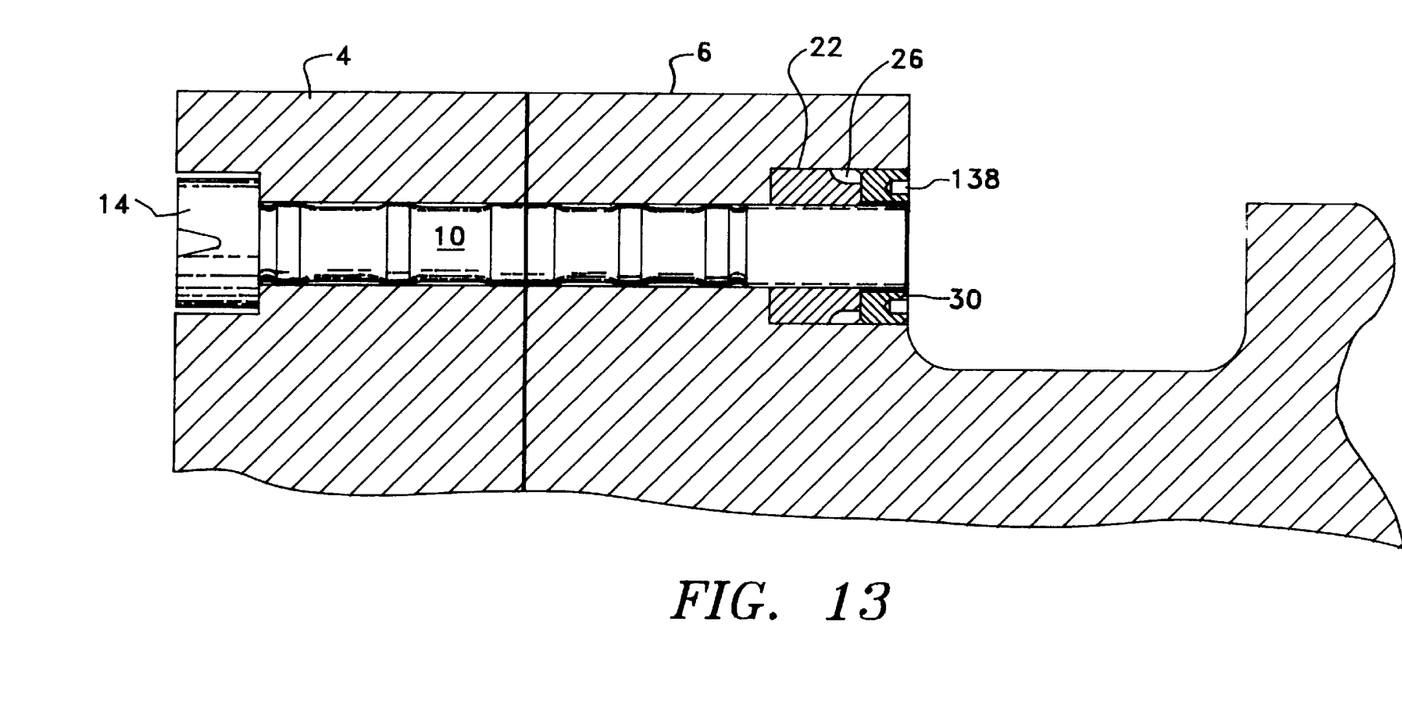
FIG. 13 is a side view of the bolt, coupling nut, and lock nut securing the flanges.

Now referring to FIG. 13, the lock nut 30 has been engaged with the threaded end 20 of the bolt 10. The lock nut has been engaged using the lock nut tool 40.

Figure 14:
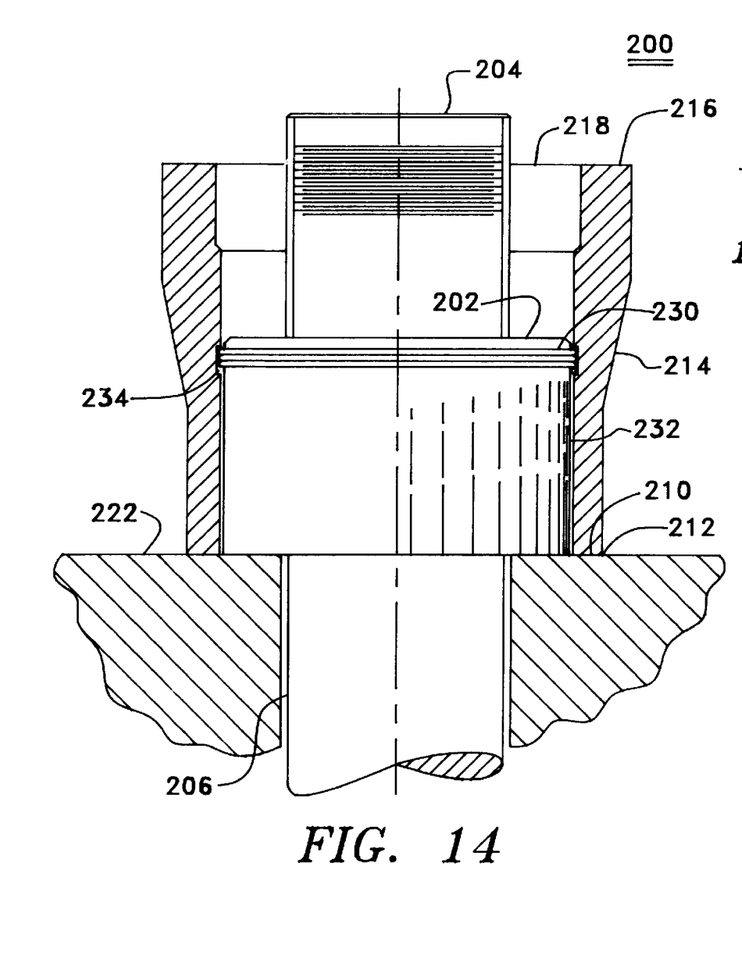
FIG. 14 is an elevational cross-sectional view of an alternative tensioner supporting means.
Figure 15:
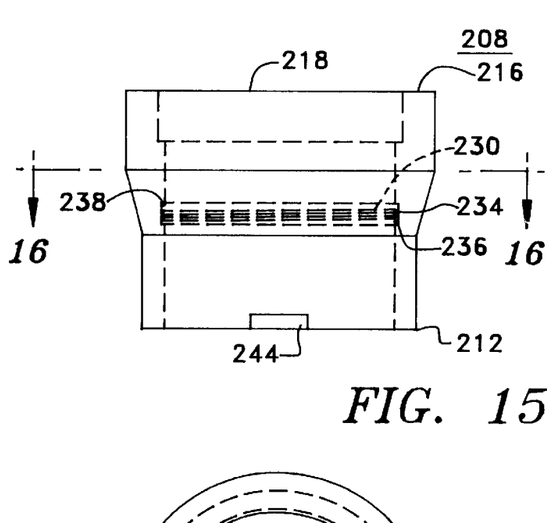
FIG. 15 is an elevational view of the hydraulic tensioner stool with hidden lines and a cord.
Figure 16:
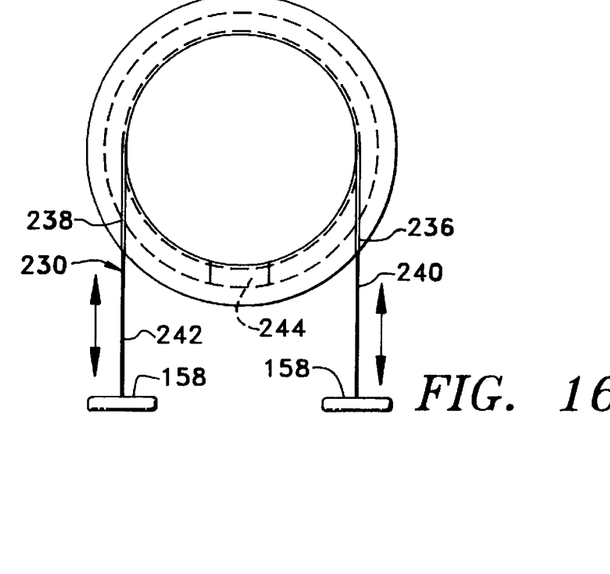
FIG. 16 is a cross-section taken through line 16—16 in FIG. 15.

Now referring to FIGS. 14, 15, and 16, in another embodiment of the invention, the rotating means for rotating a nut 202 engaged on a threaded end 204 of an axially tensioned bolt 206 is a hydraulic tensioner stool 200 comprising a tensioning support means 208 and a cord 230. The tensioning means support 208 has a bottom surface 210 with a perimeter edge 212. An exterior surface 214 extends from the perimeter edge 212 and terminates at a top surface 216. A support opening 218 extends through the bottom surface 210 and top surface 216, the support opening being defined by an interior surface 220. A tensioning means (not shown) is disposed on the top surface 216 and the bottom surface 210 is disposed on a surface 222 when the bolt 206 is being tensioned.

The cord 230 extends around the outside surface 232 of the nut 202 for 3 turns, however, other embodiments of the invention may have more or less turns, including a partial turn. The cord 230 is located in a latitudinal groove 234 that extends radially into the interior surface 220. A first cord hole 236 and a second cord hole 238 extend from the latitudinal groove 234 and through the exterior surface 214. In the preferred embodiment of the invention, the holes 236 and 238 extend tangentially from the groove. A first cord end 240 and the second cord end 242 extend through the holes 236 and 238 respectively. This embodiment of the invention operates in the same fashion as the engaging member 112 and the cord 150 but for the cord 230 applying torque directly to the nut 202 instead of indirectly through an engaging member. Further, the tensioning support means 208 has a slot 244 in the bottom surface 210 that extends through the interior surface 220 and the exterior surface 214. The slot 244 enables an operator to visually determine if the nut 202 is in contact with the surface 222. The minimal size of the slot is not detrimental to the mechanical integrity of the tensioning support means 208.

Figure 17:
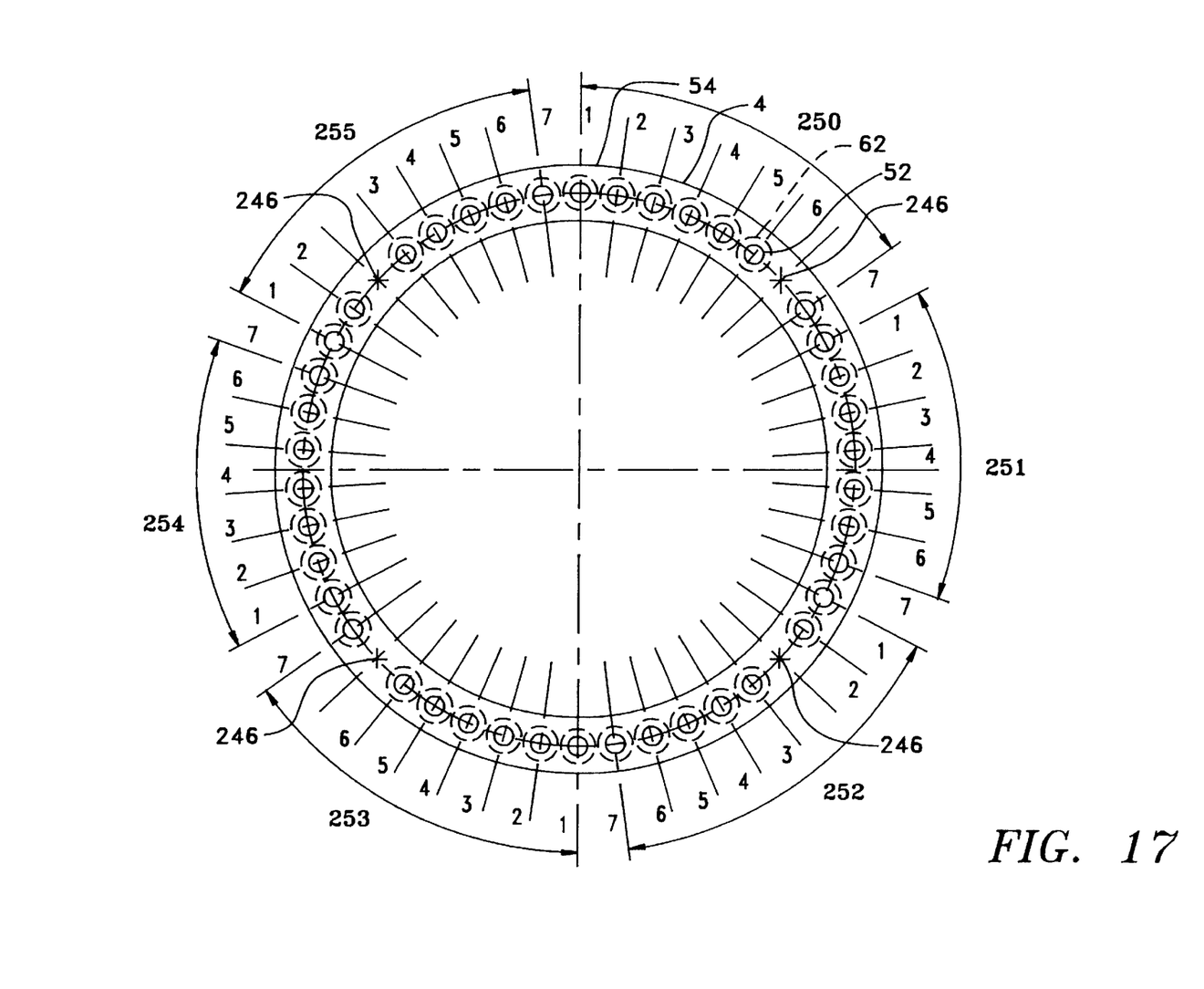
FIG. 17 is a cross-section view taken through line 17—17 in FIG. 1 showing the sequence for tensioning the bolts in an entire marriage coupling.

In the embodiment of the invention shown in FIG. 17, flange exterior surface 54 of flange 4 has 42 bolt holes 52 extending therethrough, the bolt holes forming a circular locus of points. In the preferred embodiment of the invention, the bolt holes are designated into six sections 250–256 having seven bolt holes per section. Sections 250, 252, 253, 255 have the capacity for eight bolts, but no bolt is used in the non-utilized positions 246. Six bolt tensioners 100 are used to tension the bolts, a bolt tension dedicated to each section. The bolts 10 are tensioned such that all of the first bolts in each section are bolted simultaneously, then all of the second bolts, etc. By following this method, the load on the flanges 4 and 6 applied in a balanced manner and the bolt procedure is expedited, thereby saving labor costs.

Therefore, the invention provides a quick and reliable system and method for axially tensioning bolts using a hydraulic tensioner and a rotating means. The present invention may be embodied in other specific forms without departing from the spirit or essential attributes thereof and, accordingly, reference should be made to the appended claims, rather than to the foregoing specification, as indicating the scope of the invention.

I claim:

1. A bolting system for securing together at least two structures comprising:
   a) a bolt comprising a threaded end and a bolt head;
   b) a coupling nut engageable with the threaded end comprising a top face having one or more dog indentations;
   c) a hydraulic tensioner comprising:
      i) tensioning means engageable with the threaded end for axially stretching the bolt without rotating said coupling nut; and ii) rotating means for rotating the coupling nut having a rotatable engaging member comprising an outside surface and with one or more engaging member dogs extending therefrom that complement the dog indentations wherein the rotating means comprises a cord having a cord portion extending generally latitudinally over at least a portion of the outside surface of the rotatable engaging member; and d) locking means for locking the coupling nut onto the threaded end, wherein the locking means comprises a lock nut having internal threads and a coil insert engaging the internal threads, the lock nut being engageable with the threaded end.

2. The bolting system of claim 1, wherein:
a) the coupling nut has an outside diameter;
b) the rotatable engaging member is a tube having an outside diameter approximately equal to the outside diameter of the coupling nut, and a bottom edge with the engaging member dogs extending therefrom, the tube defining a center space;
c) at least a portion of the tensioning means is disposed in the center space; and
d) the cord portion extends around the outside surface of the tube for one or more turns.

3. The bolting system of claim 2, wherein:
a) the rotating means further comprises a tensioning means support having:
 i) a bottom surface having a perimeter edge;
 ii) an exterior surface extending from the perimeter edge and terminating at a top surface;
 iii) an interior surface extending between the top and bottom surfaces defining a support opening extending therethrough;
 iv) a latitudinal groove extending radially into the interior surface; and
 v) a first and a second cord hole extending from the latitudinal groove and through the exterior surface;
b) the cord portion is disposed within the latitudinal groove with first and second cord ends extending through the first and second cord holes, respectively; and
c) the tube is at least partially disposed within the support opening.

4. The bolting system of claim 3 wherein the first and the second cord holes extend tangentially from the latitudinal groove.

5. The bolting system of claim 4 further comprising:
a) a bolt head tool for controlling the bolt head and having bolt head tool extending members; and
b) a lock nut tool for turning the lock nut and having lock nut tool extending members;
c) wherein:
 i) the bolt is comprised of forged Inconel 718;
 ii) the threaded end is comprised of rolled threads;
 iii) the bolt head is forged with an end surface having indentations that complement the bolt head tool extending members; and
 iv) the lock nut comprises a top surface having indentations that complement the lock nut tool extending members.

6. The bolting system of claim 5 further comprising an engagement tool for engaging the coupling nut with the threaded end of the bolt, the engagement tool comprising a rotating component with engagement tool dogs arranged to complement the dog indentations in the top surface of the coupling nut.

7. The bolting system of claim 6, wherein the engagement tool further comprises a dog indentation positioning means for positioning the dog indentations of the coupling nut into a predetermined position.

8. The bolting system of claims 7, wherein:
a) the rotating component of the engagement tool is a cylinder having an outside diameter approximately equal to the outside diameter of the coupling nut, the engagement tool dogs extending from a bottom edge of the rotating component, and a rim extending from a top edge of the rotating component; and
b) the rotating means of the hydraulic tensioner further comprises tube positioning means for positioning the tube such that, when the tensioning means is engaged with the threaded end of the bolt, the engaging member dogs of the tube engage the dog indentations of the coupling nut positioned into the predetermined position.

9. The bolting system of claim 8, wherein:
a) the tube has two engaging member dogs positioned 180° apart;
b) the coupling nut has two dog indentations positioned 180° apart;
c) the engagement tool has two engagement tool dogs positioned 180° apart;
d) the dog indentation positioning means comprises two marks positioned 180° apart and offset 90° from the engagement tool dogs on the rim of the engagement tool; and
e) the tube positioning means comprises a pin removably extending through the exterior and interior surfaces of the tensioning means support and a wall of the tube.

10. The bolting system of claim 9, wherein the tube, the coupling nut, the bolt head, the lock nut, and the support opening have generally circular, latitudinal cross-sections.

11. The bolting system of claim 10, further comprising a plurality of bolts, coupling nuts, and lock nuts, wherein:
a) the two structures are a first flange and a second flange of a marriage coupling for securing a compressor rotor to an expander rotor, each flange having a flange surface facing away from the other flange and a plurality of bolt holes extending through the flanges and terminating at surface openings of the first and second flange surfaces, the bolt holes having a diameter greater than a diameter of the bolts;
b) the first flange surface has a first plurality of counter bores at the first flange surface openings, each of the first plurality of counter bores being designed to accommodate one of the bolt heads;
c) the second flange surface has a second plurality of counter bores at the second flange surface openings, each of the second plurality of counter bores being designed to accommodate one of the coupling bolts and one of the lock nuts.

12. A hydraulic tensioner stool for rotating a nut engaged on a threaded end of an axially tensioned bolt comprising:
a) a tensioning means support comprising a bottom surface having a perimeter edge, an exterior surface extending from the perimeter edge and terminating at a top surface, an interior surface extending between the top and bottom surfaces defining a stool opening extending through the tensioning means support, a latitudinal groove extending radially into the interior surface, and first and second cord holes extending from the latitudinal groove and through the exterior surface; and b) a cord having a cord portion disposed within the latitudinal groove and first and second cord ends extending through the first and second cord holes, respectively.

13. The hydraulic tensioner stool of claim 12 wherein the cord is wound in one or more turns that are disposed within the latitudinal groove.

14. The hydraulic tensioner stool of claim 13 wherein the nut has a bottom face and the tensioning means support further comprises a slot in the bottom surface extending through the interior and exterior surfaces.

\* \* \* \* \*